(12) United States Patent
Hinestroza (10) Patent No.: US 6,224,018 B1
(45) Date of Patent: May 1, 2001

(54) OCCUPANT PROTECTION SYSTEM (76) Inventor: Manuel S. Hinestroza, 201 E. Ruby Ave., AP-2-D, Palisades Park, NJ (US) 07650

( * ) Notice: Subject to any disclaimer, the term of this patent is extended or adjusted under 35 U.S.C. 154(b) by 0 days.

(21) Appl. No.: 09/231,380

(22) Filed: Jan. 14, 1999

(51) Int. Cl.$^7$ .................................................. B64D 25/02
(52) U.S. Cl. ................................ 244/121; 244/122 AG; 244/140; 244/141; 297/216.1; 297/487; 280/748
(58) Field of Search .............................. 244/121, 122 R, 244/122 A, 122 AG, 122 B, 140, 141; 297/216.1, 487, 488, 465, 466; 280/748–749, 733–735, 728, 730

(56) References Cited

U.S. PATENT DOCUMENTS

| | | | |
|---|---|---|---|
| 1,281,846 | * | 10/1918 | Salari .................................... 244/140 |
| 2,276,700 | * | 3/1942 | Provenzano ........................... 244/121 |
| 2,984,211 | * | 5/1961 | Schneider ....................... 244/122 AG |
| 2,986,361 | * | 5/1961 | Codding ................................ 244/140 |
| 3,042,347 | * | 7/1962 | Halsey .................................. 244/141 |
| 3,089,482 | * | 5/1963 | Gray ............................... 244/122 AG |
| 4,359,200 | * | 11/1982 | Grevard et al. ................ 244/122 AG |
| 4,482,112 | * | 11/1984 | Cummings ..................... 244/122 AG |
| 4,508,294 | * | 4/1985 | Lorch ............................. 244/122 AG |
| 4,739,953 | * | 4/1988 | Soffiantini ...................... 244/122 AG |
| 4,813,634 | * | 3/1989 | Zuck ..................................... 244/140 |
| 5,297,761 | * | 3/1994 | Kendall, Jr. et al. ................. 244/141 |
| 5,947,515 | * | 9/1999 | Fitch ................................. 297/216.1 |
| 6,045,183 | * | 4/2000 | Weber .................................. 297/487 |

* cited by examiner

Primary Examiner—Galen L. Barefoot (57) ABSTRACT

A occupant protection system for protecting an occupant of a motor vehicle, boat, or airplane during a crash. The occupant protection system includes a chair positioned inside a vehicle such as an airplane, automobile, truck, or a boat. The chair has a seat portion and a backrest portion. The seat portion has a pair of leg clamp panels pivotally coupled to it to lock a pair of legs to the seat portion in anticipation of a crash. The backrest portion has a pair of arm clamp panels pivotally coupled to it to press the arms and torso of a user towards the backrest and hold them tightly therebetween. Also disclosed is a capsule in which the chair is disposed. The capsule has several protective layers. An emergency raft forms part of the backrest of the chair when not in use, and is removable for use in case of an accident on or above water.

19 Claims, 5 Drawing Sheets

OCCUPANT PROTECTION SYSTEM

BACKGROUND OF THE INVENTION

1. Field of the Invention

The present invention relates to emergency seats and capsules and more particularly pertains to a new occupant protection system for protecting an occupant of a motor vehicle, boat, or airplane during a crash.

2. Description of the Prior Art

The use of emergency seats and capsules is known in the prior art. More specifically, emergency seats and capsules heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 2,736,523; 5,297,761; 3,067,973; 5,058,830; 5,110,071; PCT Patent No. WO 94/22714; and PCT Patent No. WO 94/07105.

While these devices fulfill their respective, particular objectives and requirements, the aforementioned patents do not disclose a new occupant protection system. The inventive device includes a chair positioned inside a vehicle such as an airplane, automobile, truck, or a boat. The chair has a seat portion and a backrest portion. The seat portion has a pair of leg clamp panels pivotally coupled to it to lock a pair of legs to the seat portion in anticipation of a crash. The backrest portion has a pair of arm clamp panels pivotally coupled to it to press the arms and torso of a user towards the backrest and hold it tightly therebetween.

In these respects, the occupant protection system according to the present invention substantially departs from the conventional concepts and designs of the prior art, and in so doing provides an apparatus primarily developed for the purpose of protecting an occupant of a motor vehicle, boat, or airplane during a crash.

SUMMARY OF THE INVENTION

In view of the foregoing disadvantages inherent in the known types of emergency seats and capsules now present in the prior art, the present invention provides a new occupant protection system construction wherein the same can be utilized for protecting an occupant of a motor vehicle, boat, or airplane during a crash.

The general purpose of the present invention, which will be described subsequently in greater detail, is to provide a new occupant protection system apparatus and method which has many of the advantages of the emergency seats and capsules mentioned heretofore and many novel features that result in a new occupant protection system which is not anticipated, rendered obvious, suggested, or even implied by any of the prior art emergency seats and capsules, either alone or in any combination thereof.

To attain this, the present invention generally comprises a chair positioned inside a vehicle such as an airplane, automobile, truck, or a boat. The chair has a seat portion and a backrest portion. The seat portion has a pair of leg clamp panels pivotally coupled to it to lock a pair of legs to the seat portion in anticipation of a crash. The backrest portion has a pair of arm clamp panels pivotally coupled to it to press the arms and torso of a user towards the backrest and hold it tightly therebetween.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new occupant protection system apparatus and method which has many of the advantages of the emergency seats and capsules mentioned heretofore and many novel features that result in a new occupant protection system which is not anticipated, rendered obvious, suggested, or even implied by any of the prior art emergency seats and capsules, either alone or in any combination thereof.

It is another object of the present invention to provide a new occupant protection system which may be easily and efficiently manufactured and marketed.

It is a further object of the present invention to provide a new occupant protection system which is of a durable and reliable construction.

An even further object of the present invention is to provide a new occupant protection system which is susceptible of a low cost of manufacture with regard to both materials and labor, and which accordingly is then susceptible of low prices of sale to the consuming public, thereby making such occupant protection system economically available to the buying public.

Still yet another object of the present invention is to provide a new occupant protection system which provides in the apparatuses and methods of the prior art some of the advantages thereof, while simultaneously overcoming some of the disadvantages normally associated therewith.

Still another object of the present invention is to provide a new occupant protection system for protecting an occupant of a motor vehicle, boat, or airplane during a crash.

Yet another object of the present invention is to provide a new occupant protection system which includes a chair positioned inside a vehicle such as an airplane, automobile, truck, or a boat. The chair has a seat portion and a backrest portion. The seat portion has a pair of leg clamp panels pivotally coupled to it to lock a pair of legs to the seat portion in anticipation of a crash. The backrest portion has a pair of arm clamp panels pivotally coupled to it to press the arms and torso of a user towards the backrest and hold it tightly therebetween.

Still yet another object of the present invention is to provide a new occupant protection system that holds the arms and legs in place, preventing them from flailing around during a crash.

Even still another object of the present invention is to provide a new occupant protection system that includes a raft in case of shipwreck or plane crash in water.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 6 thereof, a new occupant protection system embodying the principles and concepts of the present invention and generally designated by the reference numeral 10 will be described.

As best illustrated in FIGS. 1 through 6, the occupant protection system 10 generally comprises a chair 20 positioned inside a vehicle such as an airplane, automobile, truck, or a boat. The chair 20 has a seat portion 21 and a backrest portion 22. The seat portion 21 has a pair of leg clamp panels 23 pivotally coupled to it to lock a pair of legs of a user to the seat portion 21 in anticipation of a crash. The backrest portion 22 has a pair of arm clamp panels 24 pivotally coupled to it to press the arms and torso of a user towards the backrest and hold them tightly therebetween.

Preferably, the seat portion 21 has a housing 25 that extends downwardly from it. The housing 25 has an interior. A battery 26, an oxygen tank 27, a water tank 28, and a transmitter 29 such as a walkie-talkie or positioning signal emitter are disposed in the housing 25. The housing 25 has an access panel 32 on its front for accessing the tanks, transmitter 29, and battery 26. A latch 33 keeps the access panel 32 shut. The battery 26 powers the transmitter 29.

More preferably, the housing 25 of the seat portion 21 has a pair of ankle clamps 30 pivotally coupled thereto to lock a pair of ankles of a user to the housing 25. The arm, leg, and ankle clamps may be activated by the user or may be activated automatically by a sensor, such as an airbag is deployed in automobiles.

Figure 1:
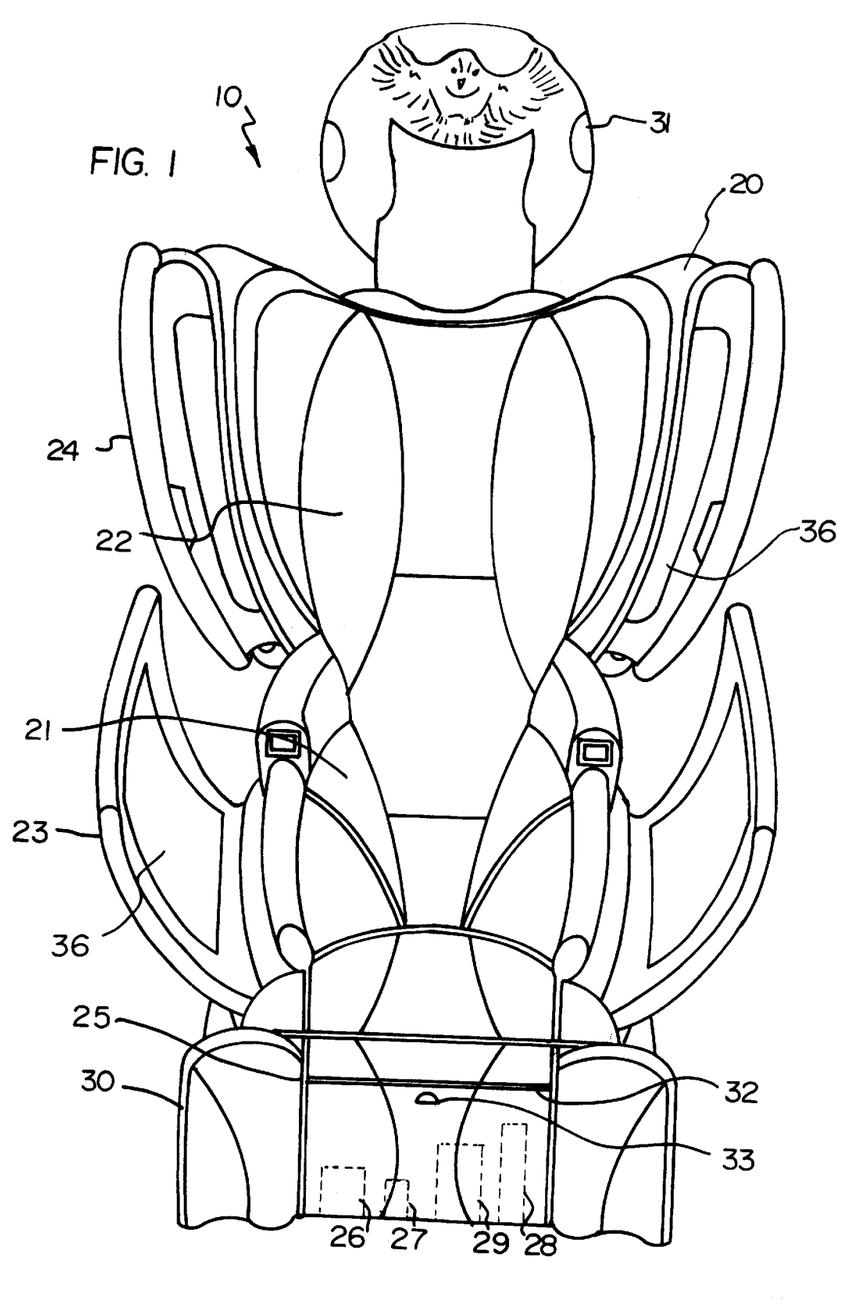
FIG. 1 is a schematic front view of a new occupant protection system according to the present invention for used in airplanes and watercraft.

Preferably, as seen in FIG. 1, each of the leg clamp panels and the arm clamp panels has an airbag 36 that deploys during an accident to push the user towards the backrest and seat portions of the chair.

Also preferably, the backrest portion 22 has a head abutting portion 31 to help prevent whiplash. Also preferably, one of the leg clamp panels 23 has a visual display (not shown) such as an LCD screen that is in communication with a camera (not shown) positioned to receive images from outside of the vehicle. The visual display displays the images from outside of the vehicle. For example, in an airplane, a person could see when the plane is about to crash so he or she can brace himself or herself for impact.

Preferably, a generally egg-shaped capsule 40 is coupled to the inside of a vehicle. The chair 20 is disposed in the capsule 40. The capsule 40 has a front opening 41 to permit access to the chair 20. The capsule 40 has a door portion 42 to selectively close the front opening 41 of the capsule 40. The door portion 42 is curved to match the contour of an inner surface of the capsule 40. Ideally, the door portion 42 is slidable along the inner surface of the capsule 40. The door portion 42 closes the front opening 41 of the capsule 40 in anticipation of a crash, either automatically by a mechanism that is activated at the moment of the crash like an airbag, or manually by the occupant of the capsule 40.

Figure 4:
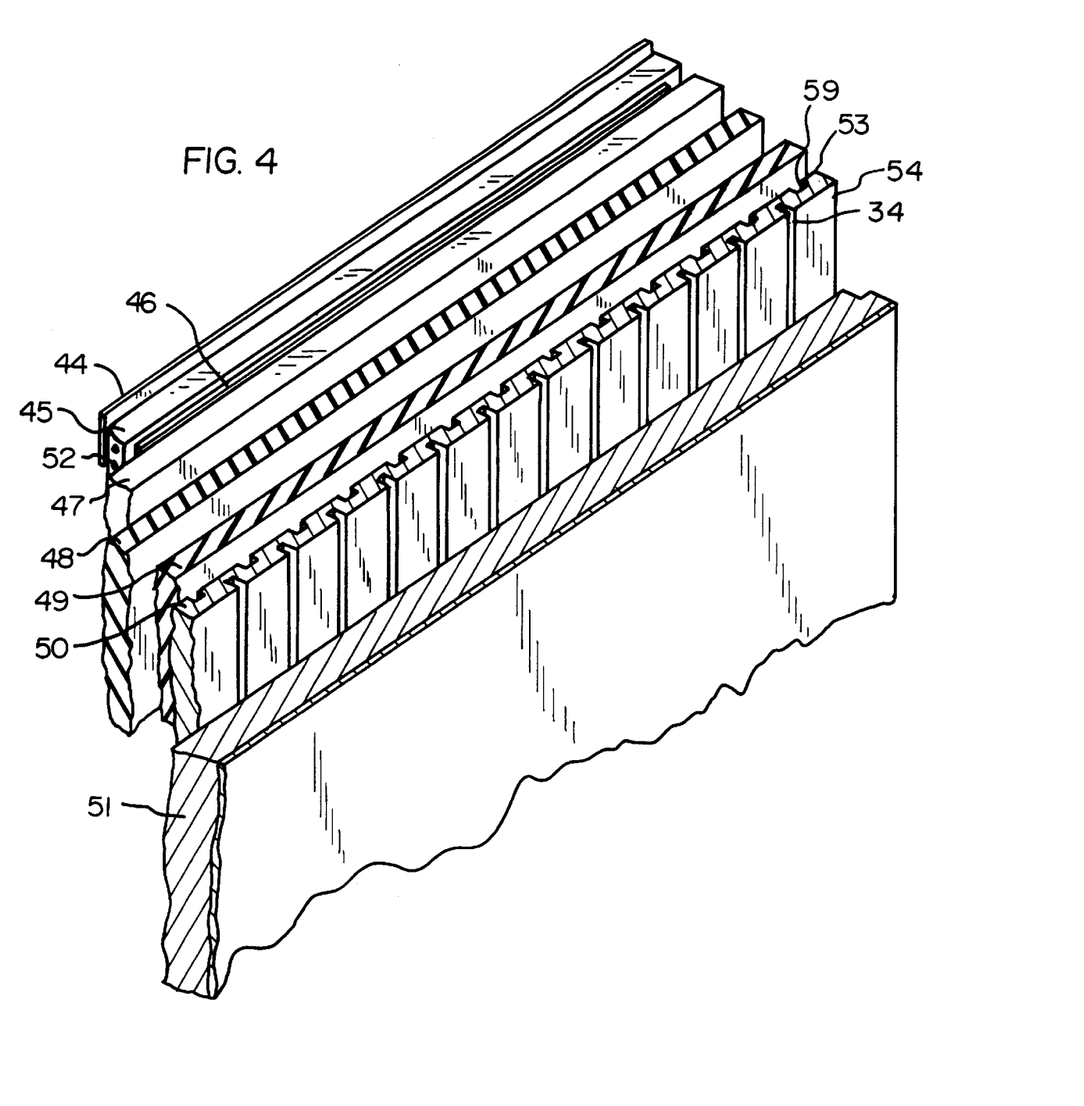
FIG. 4 is a schematic cross-sectional view of a wall structure of the capsule of the present invention.

Preferably, the capsule 40 has an inner layer 44 that forms the inner surface of the capsule 40 and comprises fiber glass. The capsule 40 has a second layer 45 adjacent the inner layer 44 that comprises an air tube layer. The air tube layer has a plurality of air tubes 52 that are coupled together. The air tubes 52 are filled with a nonflammable gas. The capsule 40 has a third layer 46 adjacent the second layer 45 that comprises fiber glass to spread out the point of impact of an object such as part of the body, or the chair 20 if the impact is strong enough to detach it from the capsule 40, striking against the inner layer 44 and pressing against the second layer 45 so that the fourth through seventh layers 47,50 are more effective in absorbs the impact.

The capsule 40 has a fourth layer 47 adjacent the third layer 46 that comprises an air bag filled with a non flammable gas. The capsule 40 has a fifth layer 48 adjacent the fourth layer 47 that comprises a nonflammable foam rubber. The capsule 40 has a sixth layer 49 adjacent the fifth layer 48 that comprises resiliently deformable rubber. The sixth layer 49 should be strong enough to stop broken pieces of aluminum from the seventh and outer layers 50,51 from poking through the inner through fifth layers 44–48, thereby deflating the second and fourth layers 45,47.

The capsule 40 has a seventh layer 50 adjacent the sixth layer 49 that comprises a crumple layer with first and second sides 53,54. The first side 53 of the crumple layer has a plurality of spaced apart and substantially parallel channels 59 extending therein. The second side 54 of the crumple layer has a plurality of spaced apart and substantially parallel channels 34 extending therein and alternating with the channels 59 in the first side 53. The crumple layer comprises a high strength light weight aluminum. The crumple layer is designed to crumple upon impact, thereby absorbing shock from the crash. The capsule 40 has an outer layer 51 adjacent the seventh layer 50 that comprises a high strength light weight aluminum for light weight and strength and a foam rubber layer positioned adjacent the seventh layer 50 to muffle sound and provide an extra layer of padding.

Ideally, the capsule 40 has a pair of speakers 43 therein connected to an audio source (not shown) such as a radio. The speakers 43 may also be coupled to an audio transmitting means (not shown) such as a CB, cellular or digital phone, or similar device.

Figure 2:
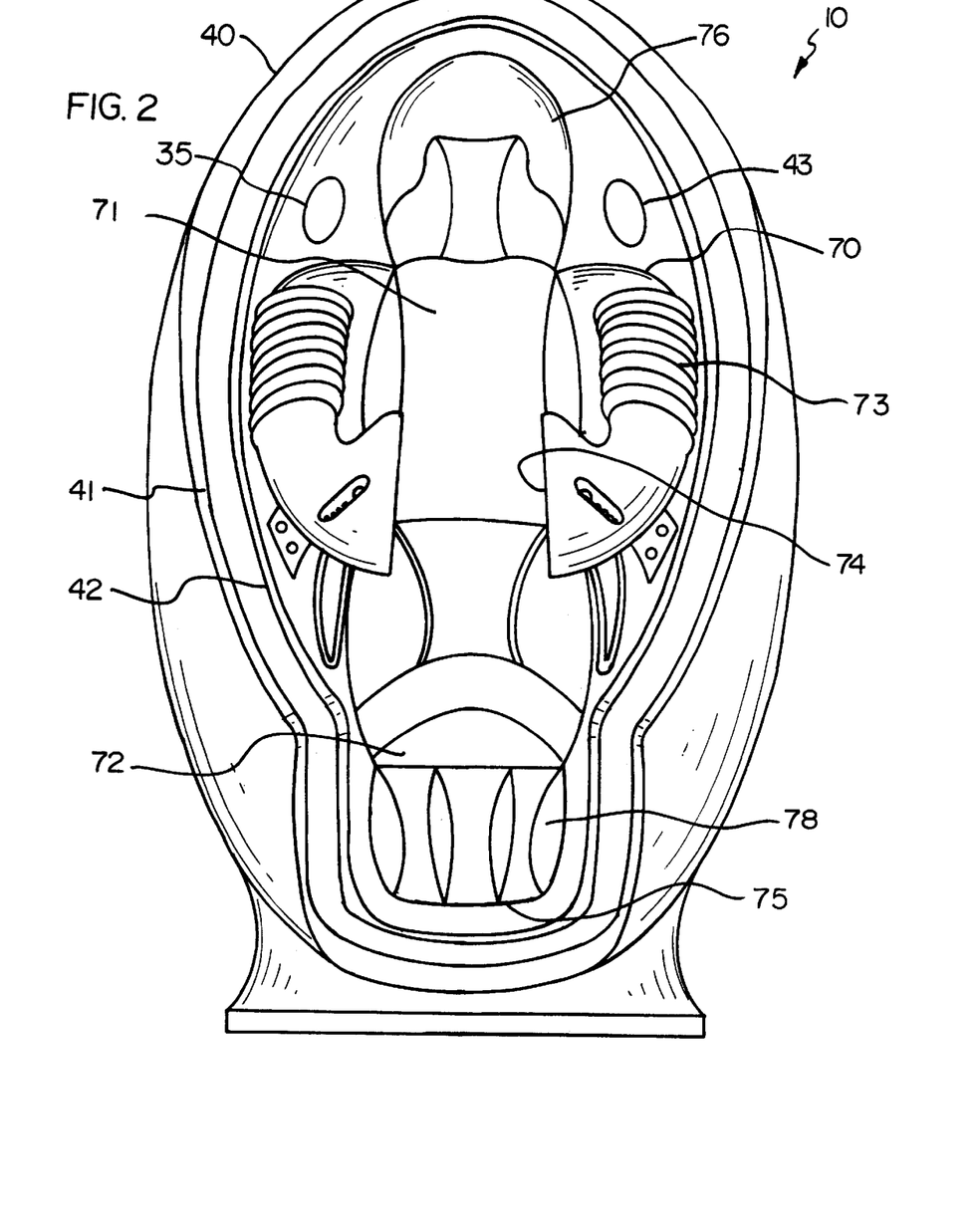
FIG. 2 is a schematic front view of the present invention for use in motor vehicles.

Also ideally, the capsule has an oxygen mask (not shown) disposed in an opening in the inner surface and covered by a mask door 35, as seen in FIG. 2.

Figure 3:
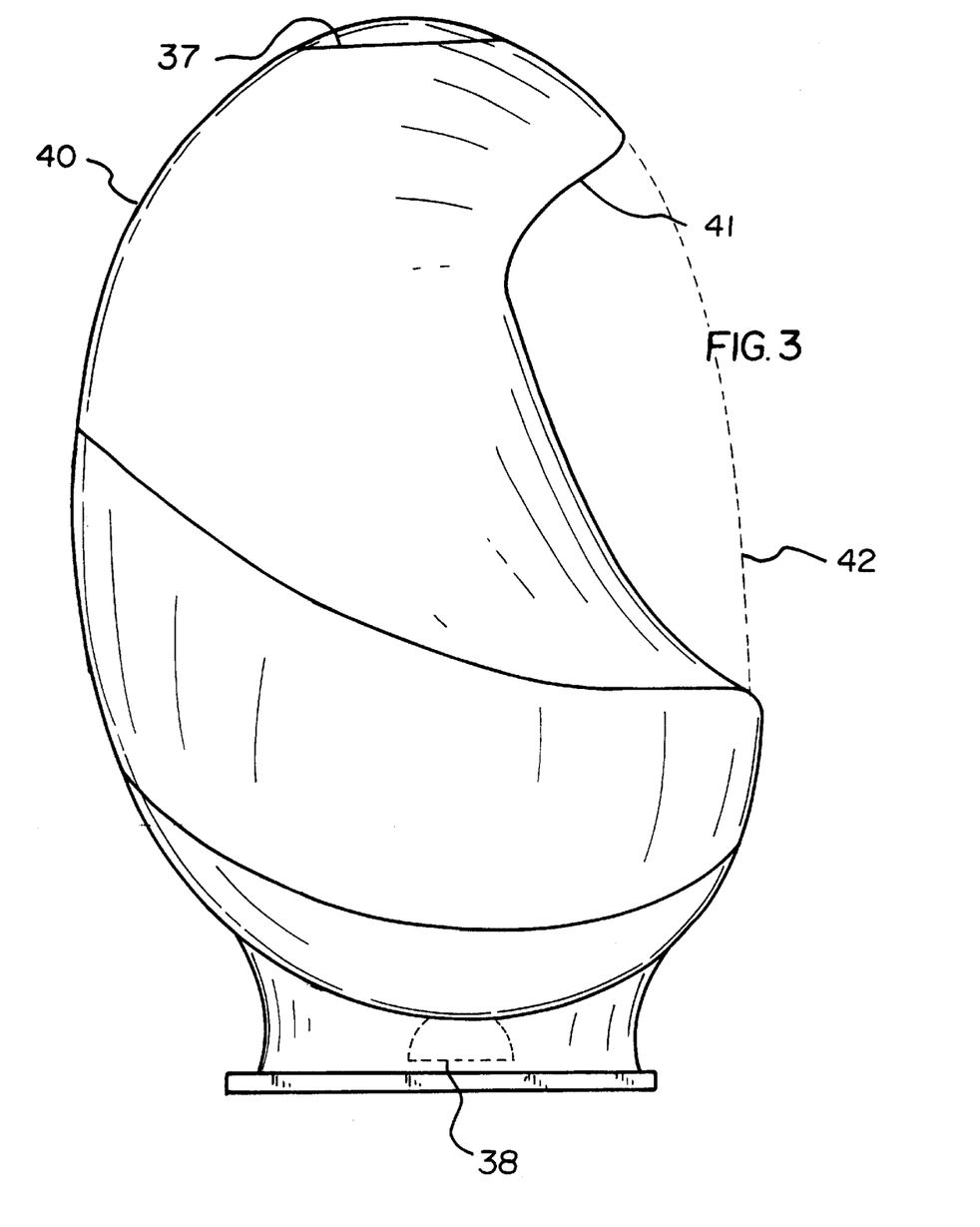
FIG. 3 is a schematic side view of a capsule of the present invention.

Optionally, referring to FIG. 3, the capsule may have a parachute (not shown) that deploys from a compartment 37 in the top tip of the capsule and a rocket propulsion device 38 for propelling the capsule out of an airplane. The parachute will be deployed by the passenger once free of the aircraft. Ideally, a remote camera and display will show the passenger the occurrences outside the capsule. Controls inside the capsule would permit the passenger to "steer" the parachute to permit landing in a safe place.

Figure 5:
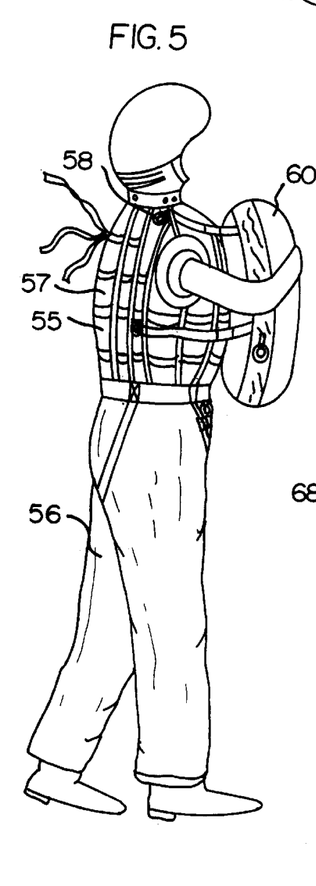
FIG. 5 is a schematic side view of a marine safety suit and raft of the present invention.
Figure 6:
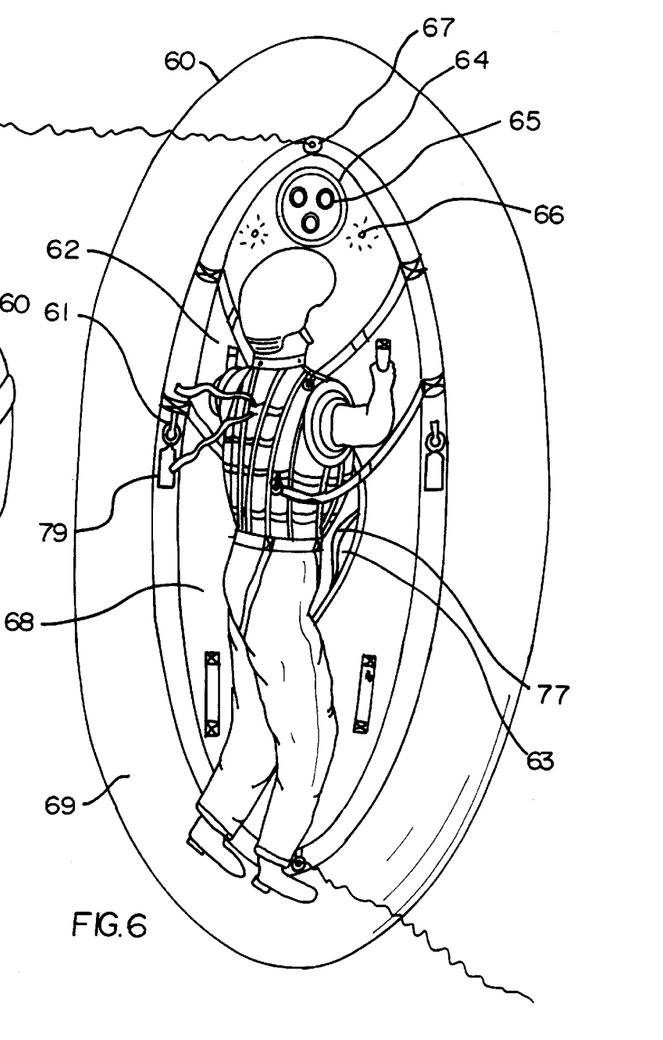
FIG. 6 is a schematic side view of the raft of the present invention in a deployed position.

Preferably, a raft 60 in a folded orientation is removably disposed in the backrest portion 22 of the chair 20. The raft 60 is self-inflating upon actuating an inflation lever 61 that releases gas from a gas canister 79 into the raft 60. Ideally, the raft 60 has a center console 68 and a generally oval shaped inflated portion 69 that extends around the center console 68. The center console 68 has upper and lower layers 62,63 and an interior defined by the upper and lower layers 62,63. The upper layer 62 has an opening to permit entry of a user into the interior of the center console 68. A zippered flap 77 covers the opening. Ideally, the center console 68 has a window portion 64 with three transparent viewing panels 65. The center console 68 has a pair of lights 66 disposed on opposite sides of the window portion 64. The center console 68 has a pair of tether portions 67 that extend from it that and are adapted for coupling a line thereto to couple a plurality of rafts 60 together.

Ideally, a wetsuit 55 is also removably housed in the chair 20. The wetsuit 55 comprises a pants portion 56 and a shirt portion 57. The shirt portion 57 has a plurality of clasps 58 for coupling the raft 60 thereto, particularly useful in stormy seas.

In use, a user sits in the chair 20. In the event of an accident, the arm clamp panels 24, leg clamp panels 23, and ankle clamps 30 clamp the various body parts to the chair 20. The door portion 42 closes opening of the capsule 40.

In a water accident, the raft is taken from the backrest portion 22 of the chair 20 and deployed. The user puts on the wetsuit 55. If the weather is cold or rainy the user may crawl into the interior of the raft 60. A plurality of rafts 60 may be tied together at the tether portions 67.

In an alternate embodiment, the chair 70 has an upper portion 71 and a lower portion 72. The upper portion 71 is hollow to receive a torso of a user. The upper portion 71 has a pair of flexible arm tubes 73 that extend therefrom to receive arms of a user. Each of the arm tubes 73 has a hand opening 74 to extend a hand through to hold the steering wheel of the vehicle. The lower portion 72 has a hollow leg receiving portion 78 to receive a pair of legs of a user therein. A bottom end 75 of the leg receiving portion 78 of the lower portion 72 is open and adapted to receive pedal controls of the vehicle such that a user can actuate them from inside the lower portion 72. The upper portion 71 and the lower portion 72 have padded interiors to protect an occupant during a crash.

The lower portion 72 has a housing (not shown) much like the housing 25 described above, positioned behind the hollow leg receiving portion 78. The housing has an interior that holds a battery (not shown), an oxygen tank (not shown), a water tank (not shown), and a transmitter (not shown) such as a walkie-talkie or positioning signal emitter. An access panel (not shown) in the side of the housing provides access to the battery, oxygen tank, water tank, and transmitter. The upper portion 71 has a head abutting portion 76 to help prevent whiplash.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An occupant safety system comprising, in combination:
    a chair coupled to an inside a vehicle and having a seat portion and a backrest portion;
    said seat portion having a pair of leg clamp panels pivotally coupled thereto for locking a pair of legs to said seat portion;
    said backrest portion having a pair of arm clamp panels pivotally coupled thereto for pressing said arms and torso of a user towards said backrest; and
    wherein one of said leg clamp panels has a visual display being in communication with a camera positioned to receive images from outside of the vehicle, said visual display displaying said images from outside of said vehicle.

2. The occupant safety system of claim 1, wherein said seat portion has a housing extending downwardly therefrom, said housing having an interior, said housing having a battery, an oxygen tank, a water tank, and a transmitter disposed in said housing, said housing having an access panel on a front thereof for accessing said tanks, transmitter, and battery.

3. The occupant safety system of claim 2, wherein said housing of said seat portion has a pair of ankle clamps pivotally coupled thereto for locking a pair of ankles to said housing.

4. The occupant safety system of claim 1, further comprising a capsule coupled to said vehicle, said chair being disposed in said capsule, said capsule having a front opening for providing access to said chair.

5. The occupant safety system of claim 4, wherein said capsule has a door portion for selectively closing said front opening of said capsule, said door portion being curved to match the contour of an inner surface of said capsule, said door portion being slidable along said inner surface of said capsule.

6. The occupant safety system of claim 4, wherein said capsule has an inner layer forming an inner surface of said capsule and comprising fiber glass.

7. The occupant safety system of claim 6, wherein said capsule has a second layer adjacent said inner layer and comprising an air tube layer, said air tube layer having a plurality of air tubes being coupled together, said air tubes being filled with a nonflammable gas.

8. The occupant safety system of claim 7, wherein said capsule has a third layer adjacent said second layer and comprising fiber glass for spreading out the point of impact of an object striking against the inner layer and pressing against said second layer.

9. The occupant safety system of claim 8, wherein said capsule has a fourth layer adjacent said third layer and comprising an air bag filled with a non flammable gas.

10. The occupant safety system of claim 9, wherein said capsule has a fifth layer adjacent said fourth layer and comprising nonflammable foam rubber.

11. The occupant safety system of claim 10, wherein said capsule has a sixth layer adjacent said fifth layer and comprising resiliently deformable rubber.

12. The occupant safety system of claim 11, wherein said capsule has a seventh layer adjacent said sixth layer and comprising a crumple layer having first and second sides, said first side of said crumple layer having a plurality of spaced apart and substantially parallel channels extending therein, said second side of said crumple layer having a plurality of spaced apart and substantially parallel channels extending therein and alternating with said channels in said first side, said crumple layer comprising a high strength light weight aluminum.

13. The occupant safety system of claim 12, wherein said capsule having an outer layer adjacent said seventh layer and comprising a high strength light weight aluminum.

14. The occupant safety system of claim 4, wherein said capsule has an inner layer forming an inner surface of said capsule and comprising fiber glass, said capsule having an outer layer comprising a high strength light weight aluminum, said capsule having a second layer positioned between said inner and outer layers and comprising an air tube layer, said air tube layer having a plurality of air tubes being coupled together, said capsule having a third layer positioned between said inner and outer layers and comprising fiber glass, said capsule having a fourth layer positioned between said inner and outer layers and comprising an air bag, said capsule having a fifth layer positioned between said inner and outer layers and comprising foam rubber, said capsule having a sixth layer positioned between said inner and outer layers and comprising resiliently deformable rubber, said capsule having a seventh layer positioned between said inner and outer layers and comprising a crumple layer having first and second sides, said first side of said crumple layer having a plurality of spaced apart and substantially parallel channels extending therein, said second side of said crumple layer having a plurality of spaced apart and substantially parallel channels extending therein and alternating with said channels in said first side, said crumple layer comprising a high strength light weight aluminum.

15. The occupant safety system of claim 1, further comprising a raft in a folded orientation being removably disposed in said backrest of said chair, said raft being self-inflating upon actuating an inflation lever.

16. The occupant safety system of claim 15, wherein said raft has a center console and a generally oval shaped inflated portion extending around said center console, said center console having upper and lower layers and an interior defined by said upper and lower layers, said upper layer having an opening for permitting entry of a user into said interior of said center console.

17. The occupant safety system of claim 16, wherein said center console has a pair of lights disposed on opposite sides of a window portion.

18. An occupant safety system comprising, in combination:
  a chair positioned inside a vehicle and having a seat portion and a backrest portion;
  said seat portion having a pair of leg clamp panels pivotally coupled thereto for locking a pair of legs to said seat portion;
  said backrest portion having a pair of arm clamp panels pivotally coupled thereto for pressing said arms and torso of a user towards said backrest;
  said seat portion having a housing extending downwardly therefrom, said housing having an interior, said housing having a battery, an oxygen tank, a water tank, and a transmitter disposed in said housing, said housing having an access panel on a front thereof for accessing said tanks, transmitter, and battery;
  said housing of said seat portion having a pair of ankle clamps pivotally coupled thereto for locking a pair of ankles to said housing;
  said backrest portion having a head abutting portion for helping prevent whiplash;
  one of said leg clamp panels having a visual being in communication with a camera positioned to receive images from outside of the vehicle, said visual display displaying said images from outside of said vehicle;
  a generally egg-shaped capsule coupled to said vehicle, said chair being disposed in said capsule, said capsule having a front opening for providing access to said chair;
  said capsule having a door portion for selectively closing said front opening of said capsule, said door portion being curved to match the contour of an inner surface of said capsule, said door portion being slidable along said inner surface of said capsule;
  said capsule having a pair of speakers therein;
  said capsule having an inner layer forming said inner surface of said capsule and comprising fiber glass;
  said capsule having a second layer adjacent said inner layer and comprising an air tube layer, said air tube layer having a plurality of air tubes being coupled together, said air tubes being filled with a nonflammable gas;
  said capsule having a third layer adjacent said second layer and comprising fiber glass for spreading out the point of impact of an object striking against the inner layer and pressing against said second layer;
  said capsule having a fourth layer adjacent said third layer and comprising an air bag filled with a non flammable gas;
  said capsule having a fifth layer adjacent said fourth layer and comprising a nonflammable foam rubber;
  said capsule having a sixth layer adjacent said fifth layer and comprising resiliently deformable rubber;

said capsule having a seventh layer adjacent said sixth layer and comprising a crumple layer having first and second sides, said first side of said crumple layer having a plurality of spaced apart and substantially parallel channels extending therein, said second side of said crumple layer having a plurality of spaced apart and substantially parallel channels extending therein and alternating with said channels in said first side, said crumple layer comprising a high strength light weight aluminum;

said capsule having an outer layer adjacent said seventh layer and comprising a high strength light weight aluminum;

a raft in a folded orientation being removably disposed in said backrest of said chair, said raft being self-inflating upon actuating an inflation lever;

said raft having a center console and a generally oval shaped inflated portion extending around said center console;

said center console having upper and lower layers and an interior defined by said upper and lower layers, said upper layer having an opening for permitting entry of a user into said interior of said center console;

said center console having a window portion with three transparent viewing panels;

said center console having a pair of lights disposed on opposite sides of said window portion; and said center console having a pair of tether portions extending therefrom and adapted for coupling a line thereto.

19. An occupant safety system comprising, in combination:

a chair coupled to an inside a vehicle and having a seat portion and a backrest portion;

said seat portion having a pair of leg clamp panels pivotally coupled thereto for locking a pair of legs to said seat portion;

said backrest portion having a pair of arm clamp panels pivotally coupled thereto for pressing said arms and torso of a user towards said backrest;

a capsule coupled to said vehicle, said chair being disposed in said capsule, said capsule having a front opening for providing access to said chair; and wherein said capsule has an inner layer forming an inner surface of said capsule and comprising fiber glass, said capsule having an outer layer comprising a high strength light weight aluminum, said capsule having a second layer positioned between said inner and outer layers and comprising an air tube layer, said air tube layer having a plurality of air tubes being coupled together, said capsule having a third layer positioned between said inner and outer layers and comprising fiber glass, said capsule having a fourth layer positioned between said inner and outer layers and comprising an air bag, said capsule having a fifth layer positioned between said inner and outer layers and comprising foam rubber, said capsule having a sixth layer positioned between said inner and outer layers and comprising resiliently deformable rubber, said capsule having a seventh layer positioned between said inner and outer layers and comprising a crumple layer having first and second sides, said first side of said crumple layer having a plurality of spaced apart and substantially parallel channels extending therein, said second side of said crumple layer having a plurality of spaced apart and substantially parallel channels extending therein and alternating with said channels in said first side, said crumple layer comprising a high strength light weight aluminum.

\* \* \* \* \*